US010976267B2

United States Patent
Fujita et al.

(10) Patent No.: US 10,976,267 B2
(45) Date of Patent: *Apr. 13, 2021

(54) METHOD OF ANALYZING DIFFRACTION DATA OBTAINED FROM A SINGLE CRYSTAL OF A POROUS COMPOUND AND A COMPOUND FOR WHICH A STRUCTURE IS TO BE DETERMINED

(71) Applicant: JAPAN SCIENCE AND TECHNOLOGY AGENCY, Kawaguchi (JP)

(72) Inventors: Makoto Fujita, Tokyo (JP); Yasuhide Inokuma, Tokyo (JP); Kentaro Yamaguchi, Sanuki (JP)

(73) Assignee: JAPAN SCIENCE AND TECHNOLOGY AGENCY, Saitama (JP)

( * ) Notice: Subject to any disclaimer, the term of this patent is extended or adjusted under 35 U.S.C. 154(b) by 358 days.

This patent is subject to a terminal disclaimer.

(21) Appl. No.: 15/500,629

(22) PCT Filed: Jul. 30, 2015

(86) PCT No.: PCT/JP2015/071682
§ 371 (c)(1),
(2) Date: Jan. 31, 2017

(87) PCT Pub. No.: WO2016/017770
PCT Pub. Date: Feb. 4, 2016

(65) Prior Publication Data
US 2017/0219500 A1  Aug. 3, 2017

(30) Foreign Application Priority Data
Jul. 31, 2014  (JP) ............................. JP2014-156626

(51) Int. Cl.
*C30B 7/08* (2006.01)
*G01N 23/20* (2018.01)
*G01N 23/205* (2018.01)

(52) U.S. Cl.
CPC ........... *G01N 23/20* (2013.01); *G01N 23/205* (2013.01)

(58) Field of Classification Search
CPC .. C30B 7/00; C30B 7/005; C30B 7/02; C30B 7/04; C30B 7/08; C30B 7/14; C30B 19/00; C30B 19/10; G01N 23/20; G01N 23/205
(Continued)

(56) References Cited

U.S. PATENT DOCUMENTS 5,590,053 A    12/1996  Ito et al.
10,190,952 B2 *  1/2019  Fujita .................. C07D 311/30
(Continued)

FOREIGN PATENT DOCUMENTS

JP    H07-131083 A    5/1995
JP    2006-188560 A   7/2006
(Continued)

OTHER PUBLICATIONS

Inokuma, et al. publication enttitled "X-ray analysis on the nanogram to microgram scale using porous complexes," Nature, vol. 495, pp. 461-466 (Mar. 2013). (Year: 2013).*
(Continued)

*Primary Examiner* — Kenneth A Bratland, Jr.
(74) *Attorney, Agent, or Firm* — Westerman, Hattori, Daniels & Adrian, LLP

(57) ABSTRACT

The present invention is a method for analyzing diffraction data obtained using a crystal structure analysis sample, the sample comprising a single crystal of a porous compound, and a compound for which a structure is to be determined.

(Continued)

The method comprising: a step (I) that selects a space group that is identical to a space group of the single crystal of the porous compound, or a space group that has a symmetry lower than that, to be a space group of the crystal structure analysis sample; a step (II) that determines an initial structure of the crystal structure analysis sample using diffraction data with respect to a crystal structure of the single crystal of the porous compound as initial values; and a step (III) that refines the initial structure determined.

4 Claims, 4 Drawing Sheets

(58) Field of Classification Search
USPC .............. 117/11, 13, 35, 53–55, 63, 68–69; 702/22, 27–28
See application file for complete search history.

(56) References Cited

U.S. PATENT DOCUMENTS

2015/0219533 A1    8/2015  Fujita et al.
2019/0137367 A1*   5/2019  Fujita .................. G01N 1/28

FOREIGN PATENT DOCUMENTS

JP    2008-214318 A    9/2008
WO    2014/038221 A1   3/2014

OTHER PUBLICATIONS

Moritomo, Y., "Fundamentals and Practices of Structural Analysis, and Research Frontiers of Structures and Physical Properties", Study of Physical Properties, Feb. 20, 2009, vol. 91, No. 5, pp. 540-566; cited in International Preliminary Report on Patentability dated Jan. 31, 2017.
International Preliminary Report on Patentability (PCT/IB/373) issued in counterpart International Application No. PCT/JP2015/071682, with Form PCT/ISA/237. (8 pages).
Inokuma, Y. et al., "X-ray Analysis on the Nanogram to Microgram Scale Using Porous Complexes", Nature, Mar. 27, 2013, vol. 495, No. 7445, pp. 461-466; cited in Extended (supplementary) European Search Report dated Jan. 15, 2018.
Extended (supplementary) European Search Report dated Jan. 15, 2018, issued in counterpart European Application No. 15826644.5. (7 pages).
Acta Cryst. A46, pp. 194-201(1990). (8 pages).
Material Matters No. 7—Fundamentals of Porous Coordination Polymer (PCP)/Metal-Organic Frameworks (MOF) (Sep. 2012) published by Sigma-Aldrich. (16 pages) with "Brief explanation of the cited document" (1 page).

* cited by examiner

METHOD OF ANALYZING DIFFRACTION DATA OBTAINED FROM A SINGLE CRYSTAL OF A POROUS COMPOUND AND A COMPOUND FOR WHICH A STRUCTURE IS TO BE DETERMINED

TECHNICAL FIELD

The present invention relates to a method that more conveniently and efficiently analyzes diffraction data when implementing single crystal structure analysis, a computer program that causes a computer to implement the method, and a recording medium.

BACKGROUND ART

X-ray single crystal structure analysis is known as a method for determining the molecular structure of a compound. According to X-ray single crystal structure analysis, it is possible to obtain a three-dimensional image of a molecule at an atomic level. Therefore, X-ray single crystal structure analysis is very useful for the research of a functional substance such as a physiologically active substance, for example.

When implementing X-ray single crystal structure analysis, X-rays are applied to a single crystal to detect the diffracted X-rays, and diffraction data is collected and analyzed to determine the molecular structure.

Since the diffracted X-rays thus detected normally do not have phase information, it is impossible to determine the molecular structure (electron density distribution) directly by Fourier synthesis. Therefore, a crystal structure model is formed, and refined to obtain a crystal structure that conforms to the diffraction data, and the molecular structure is determined.

For example, an ordinary X-ray single crystal structure analysis process (see FIG. 1) collects diffraction data, determines the space group, and determines the initial phase to form a crystal structure model. The crystal structure model is refined to obtain a crystal structure that conforms to the measured diffraction data, and the molecular structure is determined (see Non-Patent Literature 1).

As described above, it is necessary to determine an appropriate space group and an appropriate initial phase when analyzing diffraction data. However, since special crystallographic knowledge is required to determine an appropriate space group and an appropriate initial phase, these steps impose a significant burden on researchers and the like who are unfamiliar with crystallography.

Therefore, a method that can more conveniently and efficiently analyze diffraction data has been desired.

CITATION LIST

Non-Patent Literature

Non-Patent Literature 1: *Kagakusha no tameno Kiso Koza* (Basic Courses for Chemists) 12-X-ray structure analysis, editor: the Chemical Society of Japan, publisher: Asakura Publishing Co., Ltd., Mar. 20, 1999 (first impression of the first edition)

SUMMARY OF INVENTION

Technical Problem

The invention was conceived in view of the above situation. An object of the invention is to provide a method that more conveniently and efficiently analyzes diffraction data when implementing single crystal structure analysis, a computer program that causes a computer to implement the method, and a recording medium that stores the computer program.

Solution to Problem

The inventors conducted extensive studies in order to solve the above problem. As a result, the inventors found that it is possible to more conveniently and efficiently analyze diffraction data when analyzing diffraction data obtained using a crystal structure analysis sample that includes a single crystal of a porous compound, and a compound for which the structure is to be determined, the single crystal of the porous compound having a three-dimensional framework, and either or both of pores and voids that are defined by the three-dimensional framework, and are three-dimensionally arranged in an ordered manner, the three-dimensional framework having been determined by crystal structure analysis, and molecules of the compound for which the structure is to be determined being arranged in either or both of the pores and the voids of the single crystal of the porous compound in an ordered manner, by utilizing the space group of the single crystal of the porous compound and diffraction data with respect to the crystal structure of the single crystal of the porous compound as initial values. This finding has led to the completion of the invention.

Several aspects of the invention provide the following method for analyzing diffraction data (see (1)), computer program (see (2) to (5)), and recording medium (see (6)).

(1) A method for analyzing diffraction data obtained using a crystal structure analysis sample, the crystal structure analysis sample including a single crystal of a porous compound, and a compound for which the structure is to be determined, the single crystal of the porous compound having a three-dimensional framework, and either or both of pores and voids that are defined by the three-dimensional framework, and are three-dimensionally arranged in an ordered manner, the three-dimensional framework having been determined by crystal structure analysis, and molecules of the compound for which the structure is to be determined being arranged in either or both of the pores and the voids in an ordered manner, the method including:

a step (I) that selects a space group that is identical to the space group of the single crystal of the porous compound, or a space group that has a symmetry lower than that of the space group of the single crystal of the porous compound, to be the space group of the crystal structure analysis sample;

a step (II) that determines an initial structure of the crystal structure analysis sample using diffraction data with respect to the crystal structure of the single crystal of the porous compound as initial values; and a step (II) that refines the initial structure determined by the step (II).

(2) A program for analyzing diffraction data, the program causing a computer to implement the method according to (1).

(3) The program according to (2), the program causing the computer to implement:

a process (I) that derives a space group that has a symmetry lower than that of the space group of the single crystal of the porous compound;

a process (II) that determines one space group selected from the space group that is identical to the space group of the single crystal of the porous compound, and the space group derived by the process (I), to be a space group that is used to analyze the diffraction data with respect to the crystal structure analysis sample;

a process (III) that analyzes the diffraction data with respect to the crystal structure analysis sample using the space group determined by the process (II), and the diffraction data with respect to the crystal structure of the single crystal of the porous compound as initial values; and a process (IV) that refines the crystal structure obtained by the process (III).

(4) The program according to (3), the program causing the computer to further implement a process that presents the space group derived by the process (I) to a user, wherein the process (II) determines the space group based on a determination made by the user.

(5) The program according to (3), wherein the process (II) determines the space group by means of the computer according to rules set in advance.

(6) A computer-readable recording medium storing the computer program according to any one of (2) to (5).

Advantageous Effects of Invention

Several aspects of the invention thus provide a method that more conveniently and efficiently analyzes diffraction data when implementing single crystal structure analysis, a computer program that causes a computer to implement the method, and a computer-readable recording medium that stores the computer program.

According to several aspects of the invention, it is possible to determine the initial phase without using a known method, by analyzing the diffraction data (i.e., the coordinate values of crystallographic data) with respect to the crystal structure of the single crystal of the porous compound before inclusion of the guest molecules as the initial structure.

DESCRIPTION OF EMBODIMENTS

A method for analyzing diffraction data, a computer program, and a recording medium according to the exemplary embodiments of the invention are described in detail below.

1) Method for Analyzing Diffraction Data

A method for analyzing diffraction data according to one embodiment of the invention analyzes diffraction data obtained using a crystal structure analysis sample, the crystal structure analysis sample including a single crystal of a porous compound, and a compound for which the structure is to be determined, the single crystal of the porous compound having a three-dimensional framework, and either or both of pores and voids that are defined by the three-dimensional framework, and are three-dimensionally arranged in an ordered manner, the three-dimensional framework having been determined by crystal structure analysis, and molecules of the compound for which the structure is to be determined being arranged in either or both of the pores and the voids in an ordered manner, the method including the following steps (I) to (III).

(I) Step (I)

A step that selects a space group that is identical to the space group of the single crystal of the porous compound, or a space group that has a symmetry lower than that of the space group of the single crystal of the porous compound, to be the space group of the crystal structure analysis sample.

(II) Step (I)

A step that determines the initial structure of the crystal structure analysis sample using diffraction data with respect to the crystal structure of the single crystal of the porous compound as initial values.

(III) Step (III)

A step that refines the initial structure determined (obtained) by the step (II).

Figure 2:
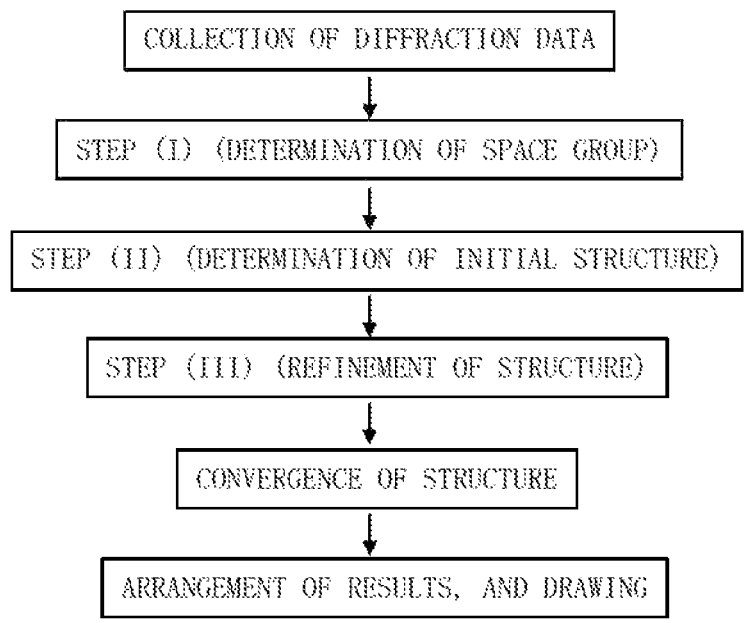
FIG. 2 is a view illustrating an example of a process that utilizes a method according to one embodiment of the invention.
Figure 3:
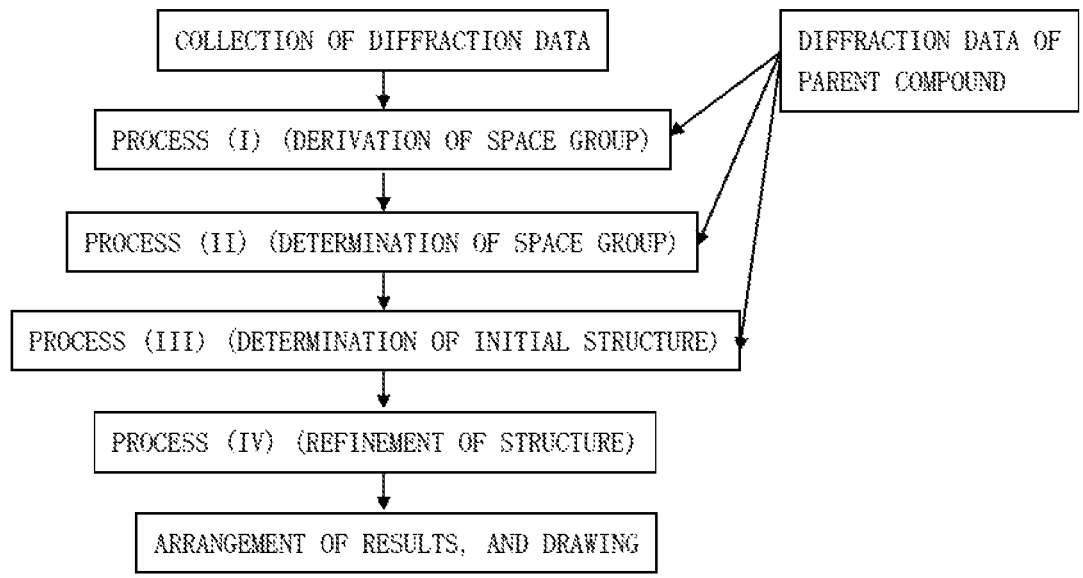
FIG. 3 is a view illustrating an example of a process that is implemented by a program according to one embodiment of the invention.

The method according to one embodiment of the invention may be implemented according to the process illustrated in FIG. 2, for example.

Collection of Diffraction Data

The diffraction data used in connection with one embodiment of the invention is obtained using the crystal structure analysis sample, the crystal structure analysis sample including a single crystal of a porous compound, and a compound for which the structure is to be determined (hereinafter may be referred to as "compound (A)"), the single crystal of the porous compound having a three-dimensional framework, and either or both of pores and voids that are defined by the three-dimensional framework, and are three-dimensionally arranged in an ordered manner, the three-dimensional framework having been determined by crystal structure analysis, and molecules of the compound (A) being arranged in either or both of the pores and the voids in an ordered manner.

(i) Single Crystal of Porous Compound

The single crystal of the porous compound has a three-dimensional framework, and either or both of pores and voids that are defined by the three-dimensional framework, and are three-dimensionally arranged in an ordered manner, the three-dimensional framework having been determined by crystal structure analysis. The method according to one embodiment of the invention utilizes the diffraction data with respect to the three-dimensional framework of the single crystal that has been determined by crystal structure analysis as initial values.

The three-dimensional framework is a framework-like structure that extends three-dimensionally within the single crystal. The three-dimensional framework includes one molecular chain, or two or more molecular chains, or includes one molecular chain, or two or more molecular chains, and a framework-forming compound.

The term "molecular chain" used herein refers to an assembly that is assembled by means of either or both of a covalent bond and a coordinate bond. The molecular chain may include a branched structure and a cyclic structure.

Examples of the three-dimensional framework that includes one molecular chain include a framework that is assembled in the form of a jungle gym.

Examples of the three-dimensional framework that includes two or more molecular chains include a framework in which two or more molecular chains are assembled by means of interactions (e.g., hydrogen bonds, π-π stacking interactions, and van der Waals forces), such as a framework in which two or more molecular chains are intertwined in the form of a puzzle ring. Examples of such a three-dimensional framework include the three-dimensional framework of the polynuclear metal complexes 1 and 2 described later.

The term "framework-forming compound" used herein refers to a compound that does not form part of a molecular chain, but forms part of a three-dimensional framework by means of interactions (e.g., hydrogen bonds, π-π stacking interactions, and van der Waals forces). Examples of the framework-forming compound include the framework-forming aromatic compound included in the polynuclear metal complex described later.

The expression "three-dimensionally arranged in an ordered manner" used herein in connection with either or both of pores and voids means that either or both of pores and voids are arranged in an ordered manner to such an extent that they can be observed by crystal structure analysis.

The term "pore" and "void" used herein refers to an internal space within a single crystal. An internal space that extends to have a tubular shape is referred to as "pore", and an internal space that does not fall under the term "pore" is referred to as "void".

The size of a pore has a correlation with the diameter of a circle that is inscribed to the pore (hereinafter may be referred to as "pore inscribed circle" or "inscribed circle") in a plane parallel to the crystal plane that is closest to a perpendicular plane with respect to the extension direction of the pore (hereinafter may be referred to as "parallel plane"). The size of a pore increases as the size of the inscribed circle increases, and decreases as the size of the inscribed circle decreases.

"The extension direction of a pore" may be determined as described below.

Figure 4:
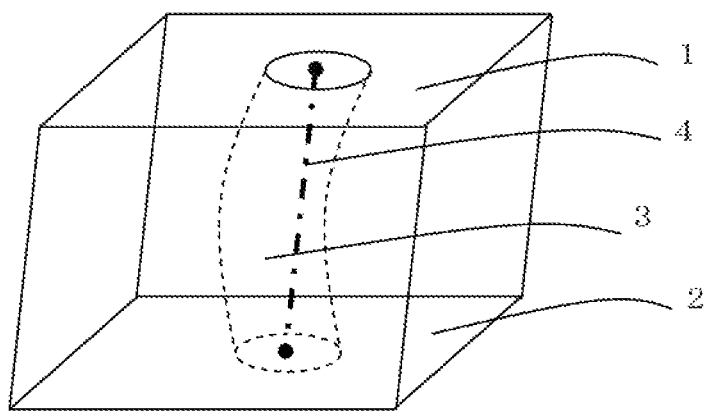
FIG. 4 is a view illustrating the extension direction of a pore formed in a single crystal.

Specifically, a crystal plane X (e.g., a plane A, a plane B, a plane C, or a diagonal plane thereof) in an appropriate direction that intersects the target pore is selected. The atoms that are present in the crystal plane X and included in the three-dimensional framework are represented using the van der Waals radius to draw a cross-sectional view of the pore taken along the crystal plane X. Likewise, a cross-sectional view of the pore taken along a crystal plane Y that is shifted from the crystal plane X by one unit cell is drawn. The center of the cross-sectional shape of the pore in the crystal plane X and the center of the cross-sectional shape of the pore in the crystal plane Y are connected by a straight line (dash-dotted line) (see FIG. 4). The direction of the straight line corresponds to the extension direction of the pore.

"The diameter of the pore inscribed circle" may be determined as described below.

Specifically, a cross-sectional view of the pore taken along the parallel plane is drawn in the same manner as described above. The pore inscribed circle is drawn using the cross-sectional view, and the diameter of the pore inscribed circle is measured. The measured value is converted into the actual scale to determine the actual diameter of the pore inscribed circle.

The diameter of the pore inscribed circle in each parallel plane is measured while gradually shifting the parallel plane by one unit cell to determine the diameter of the smallest inscribed circle and the diameter of the largest inscribed circle.

The diameter of the pore inscribed circle of the single crystal is preferably 2 to 30 Å, and more preferably 3 to 10 Å.

When the shape of the pore significantly differs from a true circle, it is preferable to predict the inclusion capability of the single crystal from the minor axis and the major axis of the pore inscribed ellipse in the parallel plane.

The major axis of the pore inscribed ellipse of the single crystal is preferably 2 to 30 Å, and more preferably 3 to 10 Å. The minor axis of the pore inscribed ellipse of the single crystal is preferably 2 to 30 Å, and more preferably 3 to 10 Å.

The pore volume in the single crystal may be calculated using the method described in Acta Crystallogr. A46, pp. 194-201 (1990) (hereinafter referred to as "Literature (A)"). Specifically, the pore volume in the single crystal may be calculated using the expression "volume of single crystal× void ratio in unit cell" based on the solvent accessible void (void volume in unit cell) calculated by a calculation program "PLATON SQUEEZE PROGRAM".

The pore volume in the single crystal (i.e., the total pore volume in one piece of the single crystal) is preferably $1 \times 10^{-7}$ to 0.1 mm$^3$, and more preferably $1 \times 10^{-5}$ to $1 \times 10^{-3}$ mm$^3$.

When the single crystal has voids, the size of each void may be calculated using the method described in Literature (A) in the same manner as the pore volume.

It is preferable that the single crystal be in the shape of a cube or a rectangular parallelepiped. The length of one side of the single crystal is preferably 10 to 1,000 μm, and more preferably 60 to 200 μm. A high-quality crystal structure analysis sample can be easily obtained by utilizing a single crystal having such a shape and size.

The three-dimensional framework of the single crystal of the porous compound that is used to prepare the crystal structure analysis sample has been determined by crystal structure analysis.

The expression "three-dimensional framework has been determined by crystal structure analysis" used herein does not mean that the single crystal that is used to prepare the crystal structure analysis sample has been analyzed by crystal structure analysis, but means that crystal structure analysis was performed using a single crystal of a porous compound that has the same three-dimensional framework as that of the single crystal that is used to prepare the crystal structure analysis sample.

The single crystal of the porous compound that is used to prepare the crystal structure analysis sample may include only the three-dimensional framework (host molecule), or may include the three-dimensional framework, and a replaceable molecule (guest molecule) that is included in either or both of the pores and the voids.

The single crystal of the porous compound that was used to determine the three-dimensional framework, and the single crystal of the porous compound that is used to prepare the crystal structure analysis sample, may differ as to the presence or absence of the guest molecule and the type of guest molecule as long as the three-dimensional framework is identical.

For example, when the crystal structure of a single crystal (1) of a porous compound in which a guest molecule (1) is included in the pores thereof is known, the single crystal (1) of the porous compound in which the guest molecule (1) is included in the pores thereof the single crystal (1) of the porous compound in which a guest molecule (2) is included in the pores thereof, and the single crystal (1) of the porous compound in which a guest molecule is not included in the pores thereof may be used to prepare the crystal structure analysis sample. After collecting the diffraction data using the resulting crystal structure analysis sample, the diffraction data may be analyzed using known crystal structure analysis results (i.e., the crystal structure analysis results for the single crystal (1) of the porous compound in which the guest molecule (1) is included in the pores thereof). More specifically, only the atomic coordinates of the single crystal (1) of the porous compound are extracted from the atomic coordinates of the crystal structure analysis results for the single crystal (1) of the porous compound in which the guest molecule (1) is included in the pores thereof and the resulting file is used in combination with the diffraction data with respect to the single crystal (1) of the porous compound in which the guest molecule (2) is included in the pores thereof, to implement crystal structure analysis in a state in which the initial phase is determined in advance.

It is preferable that the single crystal be designed so that the molecular structure can be determined with a resolution of at least 1.5 Å by applying MoKα radiation (wavelength: 0.71 Å) generated at a tube voltage of 24 kV and a tube current of 50 mA to the single crystal, and detecting the diffracted X-rays using a CCD detector. A high-quality crystal structure analysis sample can be easily obtained by utilizing a single crystal having such characteristics.

The single crystal of the porous compound is not particularly limited as long as the molecules of the compound (A) can be incorporated in either or both of the pores and the voids of the single crystal of the porous compound in an ordered manner to such an extent that the molecular structure of the compound (A) can be determined by crystal structure analysis. Examples of the single crystal of the porous compound include a single crystal of a polynuclear metal complex, a urea crystal, and the like. Among these, a crystal of a polynuclear metal complex is preferable since it is possible to easily control the size of the pores and the voids, and the environment (e.g., polarity) within the pores and the voids.

Examples of the polynuclear metal complex include a polynuclear metal complex that includes a plurality of ligands having two or more coordinating moieties, and a plurality of metal ions that serve as the center metal.

The ligand having two or more coordinating moieties (hereinafter may be referred to as "multidentate ligand") is not particularly limited as long as the ligand can form the three-dimensional framework. A known multidentate ligand may be used as the ligand.

The term "coordinating moiety" used herein refers to an atom or an atomic group included in the ligand that has an unshared electron pair that can form a coordinate bond. Examples of the coordinating moiety include a hetero atom such as a nitrogen atom, an oxygen atom, a sulfur atom, and a phosphorus atom, an atomic group such as a nitro group, an amino group, a cyano group, and a carboxyl group; and the like. Among these, a nitrogen atom and an atomic group that includes a nitrogen atom are preferable.

It is preferable that the multidentate ligand include an aromatic ring since the planarity of the ligand is improved, and a strong three-dimensional framework is easily formed.

A single crystal of a polynuclear metal complex having relatively large pores and voids is normally obtained by utilizing a multidentate ligand in which the distance from the center of the ligand to the coordinating moiety is long, and a single crystal of a polynuclear metal complex having relatively small pores and voids is normally obtained by utilizing a multidentate ligand in which the distance from the center of the ligand to the coordinating moiety is short.

It is preferable to use a multidentate ligand having two or more coordinating moieties, more preferably a multidentate ligand having three coordinating moieties (hereinafter may be referred to as "tridentate ligand"), and still more preferably a tridentate ligand in which the unshared electron pairs (orbitals) of the three coordinating moieties are present in the same plane, and the three coordinating moieties are arranged radially with respect to the center of the tridentate ligand at an equal interval, since it is possible to easily obtain a single crystal having relatively large pores and voids.

The expression "present in the same plane" used herein includes a case where each unshared electron pair is present in the same plane, and a case where each unshared electron pair is present in a plane that is shifted to some extent (e.g., present in a plane that intersects a reference plane at an angle of 20° or less).

The expression "three coordinating moieties are arranged radially with respect to the center of the tridentate ligand at an equal interval" used herein means that the three coordinating moieties are arranged on lines that extend radially from the center of the ligand at an equal interval, at an almost equal distance from the center of the ligand.

Examples of the tridentate ligand include a ligand represented by the following formula (1).

wherein Ar is a substituted or unsubstituted trivalent aromatic group, $X^1$ to $X^3$ are independently a divalent organic group, or a single bond that directly bonds Ar and $Y^1$, $Y^2$, or $Y^3$, and $Y^1$ to $Y^3$ are independently a monovalent organic group having a coordinating moiety.

Ar in the formula (1) is a trivalent aromatic group.

The number of carbon atoms included in Ar is normally 3 to 22, preferably 3 to 13, and more preferably 3 to 6.

Examples of Ar include a trivalent aromatic group having a monocyclic structure that includes one 6-membered aromatic ring, and a trivalent aromatic group having a fused ring structure in which three 6-membered aromatic rings are fused.

Examples of the trivalent aromatic group having a monocyclic structure that includes one 6-membered aromatic ring include the groups respectively represented by the following formulas (2a) to (2d). Examples of the trivalent aromatic group having a fused ring structure in which three 6-membered aromatic rings are fused, include the group represented by the following formula (2e). Note that "*" in the formulas (2a) to (2e) indicates the position at which $X^1$, $X^2$, or $X^3$ is bonded.

-continued

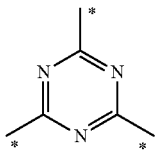

(2b)

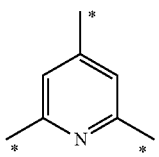

(2c)

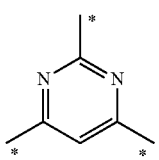

(2d)

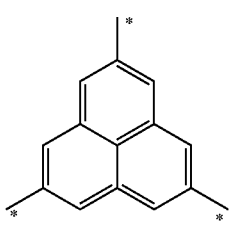

(2e)

The aromatic groups respectively represented by the formulas (2a) and (2c) to (2e) may be substituted with a substituent at an arbitrary position. Examples of the substituent include an alkyl group such as a methyl group, an ethyl group, an isopropyl group, an n-propyl group, and a t-butyl group; an alkoxy group such as a methoxy group, an ethoxy group, an n-propoxy group, and an n-butoxy group; a halogen atom such as a fluorine atom, a chlorine atom, and a bromine atom; and the like. Ar is preferably the aromatic group represented by the formula (2a) or (2b), and particularly preferably the aromatic group represented by the formula (2b).

$X^1$ to $X^3$ are independently a divalent organic group, or a single bond that directly bonds Ar and $Y^1$, $Y^2$, or $Y^3$.

The divalent organic group that may be represented by $X^1$ to $X^3$ is preferably a group that can form a π electron conjugated system together with Ar. When the divalent organic group that may be represented by $X^1$ to $X^3$ forms a π electron conjugated system, the planarity of the tridentate ligand represented by the formula (1) is improved, and a strong three-dimensional network structure is easily formed.

The number of carbon atoms included in the divalent organic group is preferably 2 to 18, more preferably 2 to 12, and still more preferably 2 to 6.

Examples of the divalent organic group include a divalent unsaturated aliphatic group having 2 to 10 carbon atoms, a divalent organic group having a monocyclic structure that consists of one 6-membered aromatic ring, a divalent organic group having a fused ring structure in which two to four 6-membered aromatic rings are fused, an amide group (—C(═O)—NH—), an ester group (—C(═O)—O—), a combination of two or more divalent organic groups among these divalent organic groups, and the like.

Examples of the divalent unsaturated aliphatic group having 2 to 10 carbon atoms include a vinylene group, an acetylene group (ethynylene group), and the like.

Examples of the divalent organic group having a monocyclic structure that includes one 6-membered aromatic ring, include a 1,4-phenylene group and the like.

Examples of the divalent organic group having a fused ring structure in which two to four 6-membered aromatic rings are fused, include a 1,4-naphthylene group, an anthracene-1,4-diyl group, and the like.

Examples of a combination of two or more divalent organic groups among these divalent organic groups include the groups respectively represented by the following formulas.

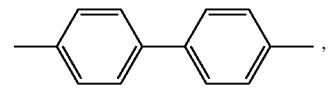

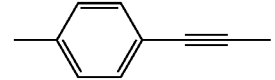

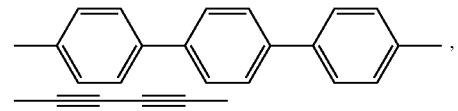

These aromatic rings may include a hetero atom (e.g., nitrogen atom, oxygen atom, and sulfur atom) in their ring.

The divalent organic group may be substituted with a substituent. Examples of the substituent include those mentioned above in connection with Ar.

The groups respectively represented by the following formulas are preferable as the divalent organic group that may be represented by $X^1$ to $X^3$.

$Y^1$ to $Y^3$ are independently a monovalent organic group having a coordinating moiety.

The organic group represented by $Y^1$ to $Y^3$ is preferably a group that can form a π electron conjugated system together with Ar and $X^1$ to $X^3$.

When the organic group represented by $Y^1$ to $Y^3$ forms a π electron conjugated system, the planarity of the tridentate ligand represented by the formula (1) is improved, and a strong three-dimensional framework is easily formed.

The number of carbon atoms included in the organic group represented by $Y^1$ to $Y^3$ is preferably 5 to 11, and more preferably 5 to 7.

Examples of the organic group represented by $Y^1$ to $Y^3$ include the organic groups respectively represented by the following formulas (3a) to (3f). Note that "*" in the formulas (3a) to (3f) indicates the position at which $X^1$, $X^2$, or $X^3$ is bonded.

(3a)
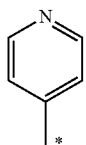

(3b)
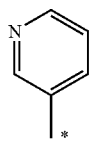

(3c)
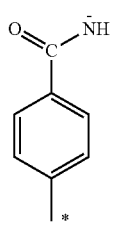

(3d)
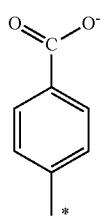

(3e)
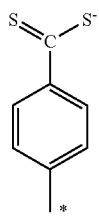

(3f)
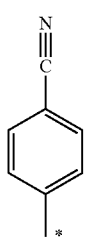

The organic groups respectively represented by the formulas (3a) to (3f) may be substituted with a substituent at an arbitrary position. Examples of the substituent include those mentioned above in connection with Ar.

The group represented by the formula (3a) is particularly preferable as $Y^1$ to $Y^3$.

The size of the pores and the voids of the single crystal can be adjusted by appropriately selecting Ar, $X^1$ to $X^3$, and $Y^1$ to $Y^3$ in the tridentate ligand represented by the formula (1). This makes it possible to efficiently obtain a single crystal that has pores and voids having a size sufficient to include the desired molecule.

It is preferable that the tridentate ligand represented by formula (1) have high planarity and high symmetry, and have a structure in which a π-conjugated system extends over the entire ligand, since a strong three-dimensional framework is easily formed. Examples of such a tridentate ligand include, but are not limited to, the ligands respectively represented by the following formulas (4a) to (4f).

(4a)
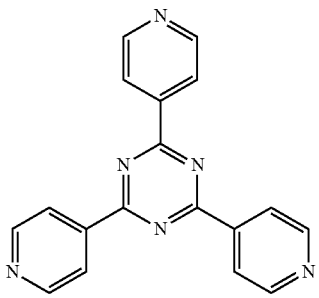

(4b)
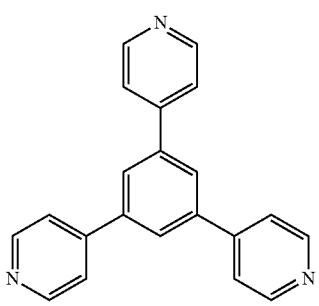

(4c)
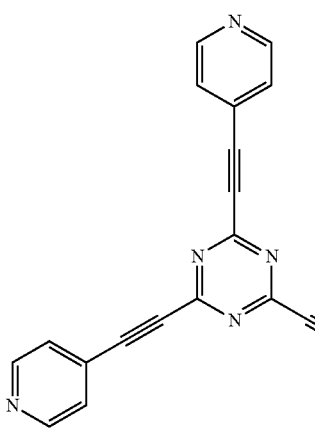

(4d)
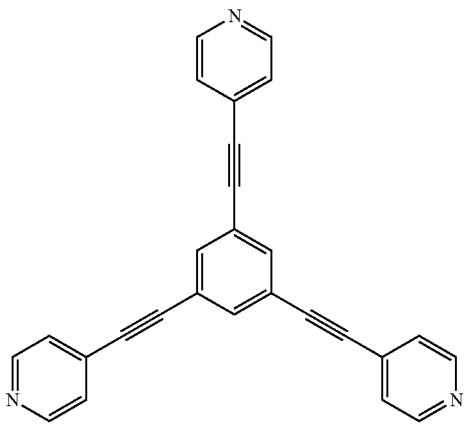

-continued (4e)

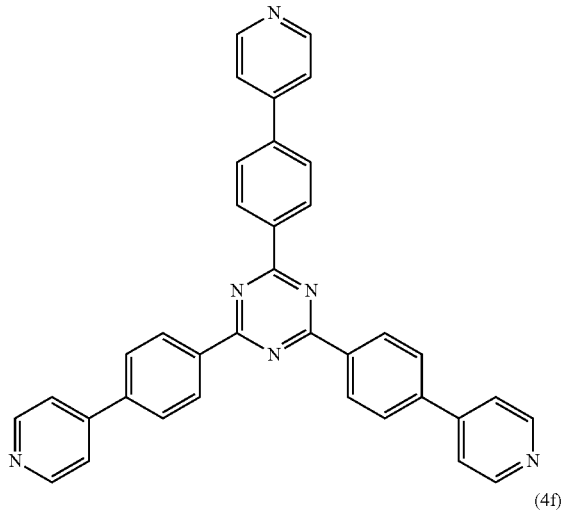

(4f)

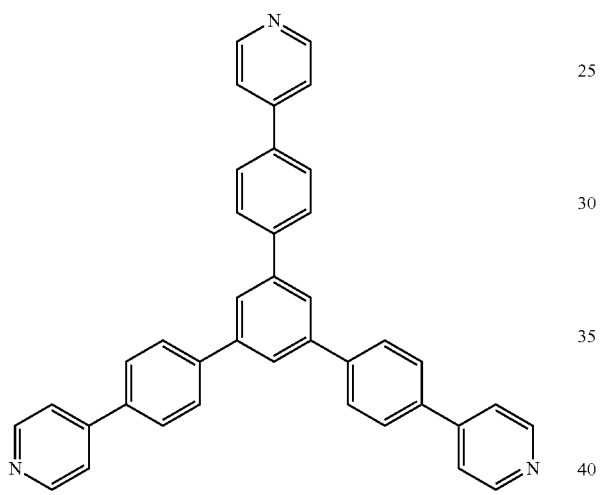

Among these, 2,4,6-tris(4-pyridyl)-1,3,5-triazine (TPT) represented by the formula (4a) is particularly preferable as the tridentate ligand represented by the formula (1).

A commercially-available product may also be used as the multidentate ligand of the polynuclear metal complex. For example, Material Matters No. 7—Fundamentals of Porous Coordination Polymers (PCP)/Metal-Organic Frameworks (MOF) (September, 2012) published by Sigma-Aldrich lists pyrazine, 1,4-diazabicyclo[2.2.2]octane, 1,2-di(4-pyridyl) ethylene, 4,4'-bipyridyl, 4,4'-biphenyldicarboxylic acid, benzene-1,3-dicarboxylic acid, pyrazine-2,3-dicarboxylic acid, pyrazine-3,5-dicarboxylic acid, and the like as a PCP/MOF ligand and a linker compound. These compounds may be used as the multidentate ligand of the polynuclear metal complex.

The metal ion that serves as the center metal of the polynuclear metal complex is not particularly limited as long as the metal ion forms a coordinate bond together with the multidentate ligand to form the three-dimensional framework. It is preferable to use an ion of a metal among the metals that respectively belong to Groups 8 to 12 in the periodic table, such as an iron ion, a cobalt ion, a nickel ion, a copper ion, a zinc ion, a silver ion, a palladium ion, a ruthenium ion, a rhodium ion, and a platinum ion, and more preferably an ion of a divalent metal among the metals that respectively belong to Groups 8 to 12 in the periodic table. It is particularly preferable to use a zinc(II) ion or a cobalt(II) ion since a single crystal having large pores and voids is easily obtained.

A monodentate ligand may be coordinated to the center metal of the polynuclear metal complex in addition to the multidentate ligand. Examples of the monodentate ligand include a monovalent anion such as a chloride ion ($Cl^-$), a bromide ion ($Br^-$), an iodide ion ($I^-$), and a thiocyanate ion ($SCN^-$); an electrically neutral coordinating compound such as ammonia, a monoalkylamine, a dialkylamine, a trialkylamine, and ethylenediamine; and the like.

The polynuclear metal complex may include a reaction solvent (i.e., a solvent used to synthesize the polynuclear metal complex), a replacement solvent (i.e., a solvent with which the reaction solvent is replaced (hereinafter the same)), and a framework-forming aromatic compound (described later).

The term "framework-forming aromatic compound" used herein refers to an aromatic compound that interacts with the molecular chain that forms the three-dimensional framework (excluding formation of a covalent bond and a coordinate bond) to form part of the three-dimensional framework.

When the polynuclear metal complex includes the framework-forming aromatic compound, a stronger three-dimensional framework can be easily obtained, and the three-dimensional framework may be further stabilized even in a state in which the polynuclear metal complex includes the molecule of the compound (A).

Examples of the framework-forming aromatic compound include a fused polycyclic aromatic compound. Examples of the fused polycyclic aromatic compound include the compounds respectively represented by the following formulas (5a) to (5i).

(5a)

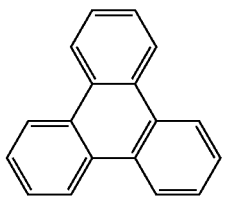

(5b)

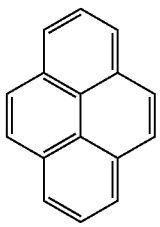

(5c)

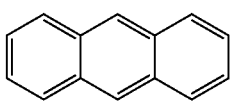

(5d)

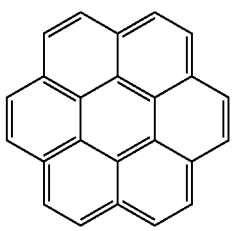

(5e)
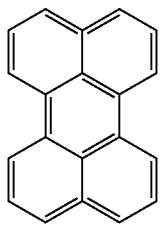

(5f)
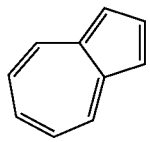

(5g)
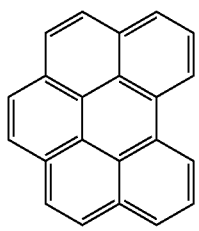

(5h)
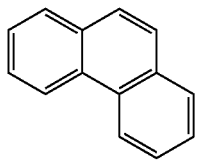

(5i)
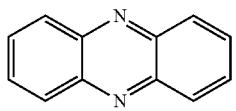

Examples of the polynuclear metal complex include the compounds listed below.
(1) Compound that includes only a ligand and a metal ion (polynuclear metal complex (α))
(2) Compound that includes the polynuclear metal complex (α) and the framework-forming aromatic compound (polynuclear metal complex (β))
(3) Compound that includes the polynuclear metal complex (α) or the polynuclear metal complex (α), and a guest molecule (e.g., solvent molecule) included therein (polynuclear metal complex (γ))

It is preferable that the polynuclear metal complex used in connection with one embodiment of the invention does not lose crystallinity even after the molecule of the compound (A) has been introduced into (incorporated in) the pores and the voids, and have relatively large pores and voids.

A polynuclear metal complex having such characteristics can be easily obtained by utilizing the tridentate ligand represented by the formula (1).

Examples of the polynuclear metal complex that is obtained by utilizing the tridentate ligand represented by the formula (1) include polynuclear metal complexes respectively represented by the following formulas (6a) to (6c).

[(MX$_2$)$_3$(L)$_2$(solv)$_a$]$_b$ (6a)

[(MX$_2$)$_3$(L)$_2$(SA)$_c$(solv)$_a$]$_b$ (6b)

[(MX$_2$)$_3$(L)$_4$(solv)$_a$]$_b$ (6c)

wherein M is an ion of a divalent metal among the metals that respectively belong to Groups 8 to 12 in the periodic table, X is a monovalent anionic monodentate ligand, L is the tridentate ligand represented by the formula (1), "solv" is a guest molecule (e.g., solvent molecule) used during synthesis, "SA" is the framework-forming aromatic compound, and a, b, and c are an arbitrary natural number.

The molecular structure (into which a guest molecule (e.g., solvent molecule) is introduced) of the polynuclear metal complexes respectively represented by the formulas (6a) to (6c) that include TPT represented by the formula (4a) as L has been determined by X-ray single crystal structure analysis. Such polynuclear metal complexes are particularly suitable as the polynuclear metal complex used in connection with one embodiment of the invention.

Examples of such polynuclear metal complexes include polynuclear metal complexes respectively represented by the following formulas (7a) to (7d).

[(ZnI$_2$)$_3$(TPT)$_2$(solv)$_a$]$_b$ (7a)

[(ZnBr$_2$)$_3$(TPT)$_2$(solv)$_a$]$_b$ (7b)

[(ZnI$_2$)$_3$(TPT)$_2$(SA)$_c$(solv)$_a$]$_b$ (7c)

[(Co(NCS)$_2$)$_3$(TPT)$_4$(solv)$_a$]$_b$ (7d)

"solv", "SA", a, b, and c in the formulas (7a) to (7d) are the same as defined above.

Examples of the polynuclear metal complex represented by the formula (7a) include [(ZnI$_2$)$_3$(TPT)$_2$(PhNO$_2$)$_{5.5}$]$_n$ (polynuclear metal complex 1) disclosed in JP-A-2008-214584 and J. Am. Chem. Soc. 2004, v. 126, pp. 16292-16293, and a polynuclear metal complex obtained by replacing all or some of the reaction solvent molecules included in the polynuclear metal complex 1 with a replacement solvent.

Examples of the polynuclear metal complex represented by the formula (7b) include [(ZnBr$_2$)$_3$(TPT)(PhNO$_2$)$_5$(H$_2$O)]$_n$ (polynuclear metal complex 2) disclosed in JP-A-2008-214318, and a polynuclear metal complex obtained by replacing all or some of the reaction solvent molecules included in the polynuclear metal complex 2 with a replacement solvent.

Examples of the polynuclear metal complex represented by the formula (7c) include [(ZnI$_2$)$_3$(TPT)$_2$(TPH)(PhNO$_2$)$_{3.9}$(MeOH)$_{1.8}$]$_n$ (polynuclear metal complex 3) and [(ZnI$_2$)$_3$(TPT)$_2$(PER)(PhNO$_2$)$_4$]$_n$ (polynuclear metal complex 4) disclosed in JP-A-2006-188560, and a polynuclear metal complex obtained by replacing all or some of the reaction solvent molecules included in the polynuclear metal complex 3 or 4 with a replacement solvent.

Examples of the polynuclear metal complex represented by the formula (7d) include [(Co(NCS)$_2$)$_3$(TPT)$_4$(DCB)$_{2.5}$(MeOH)$_5$]$_n$ (polynuclear metal complex 5) disclosed in WO2011/062260, and a polynuclear metal complex obtained by replacing all or some of the reaction solvent molecules included in the polynuclear metal complex 5 with a replacement solvent.

A known polynuclear metal complex that is referred to as "porous coordination polymer (PCP)" or "metal-organic framework (MOF)" may also be used as the polynuclear metal complex instead of the polynuclear metal complexes respectively represented by the formulas (6a) to (6c). For example, Material Matters No. 7—Fundamentals of Porous Coordination Polymers (PCP)Metal-Organic Frameworks (MOF) (September, 2012) published by Sigma-Aldrich lists polynuclear metal complexes such as [Cu$_2$(bzdc)$_2$(pyz)]$_n$ (wherein bzdc is 2,3-pyrazinedicarboxylic acid, pyz is pyrazine, and n is an arbitrary number), $[Zn_2(14bdc)_2(dabco)]_n$ (wherein 14bdc is 1,4-benzenedicarboxylic acid, dabco is 1,4-diazabicyclo[2.2.2]octane, and n is an arbitrary number), $[Cu(dhbpc)_2(bpy)]_n$ (wherein $H_3$dhbpc is 4,4'-dihydroxybiphenyl-3-carboxylic acid, bpy is 4,4'-bipyridyl, and n is an arbitrary number), and $[Cr(btc)_2]_n$ (wherein $H_3$btc is 1,3,5-benzenetricarboxylic acid, and n is an arbitrary number). These single crystals may be used in connection with one embodiment of the invention.

The polynuclear metal complex may be synthesized using an arbitrary method. The polynuclear metal complex may be synthesized using a known method.

For example, Material Matters No. 7—Fundamentals of Porous Coordination Polymers (PCP)/Metal-Organic Frameworks (MOF) (September, 2012) published by Sigma-Aldrich describes a solution method that mixes a solution that includes a multidentate ligand and the like with a solution that includes a metal ion and the like; a hydrothermal method that charges a pressure-resistant vessel with a solvent, a multidentate ligand, a metal ion, and the like, seals the pressure-resistant vessel, and heats the mixture to a temperature equal to or higher than the boiling point of the solvent to effect a hydrothermal reaction; a microwave method that charges a vessel with a solvent, a multidentate ligand, a metal ion, and the like, and applies microwaves to the mixture; an ultrasonic method that charges a vessel with a solvent, a multidentate ligand, a metal ion, and the like, and applies ultrasonic waves to the mixture; a solid-state synthesis method that mechanically mixes a multidentate ligand, a metal ion, and the like without using a solvent; and the like. A single crystal of the polynuclear metal complex can be obtained using these methods.

It is preferable to use the solution method since it is unnecessary to use special equipment, for example.

For example, a solvent solution prepared by dissolving a metal ion-containing compound in a second solvent is added to a solvent solution prepared by dissolving a multidentate ligand in a first solvent, and the mixture is allowed to stand at 0 to 70° C. for several hours to several days.

The metal ion-containing compound is not particularly limited. Examples of the metal ion-containing compound include a compound represented by $MX_n$. Note that M is a metal ion, X is a counter ion, and n is the valence of M.

Specific examples of X include $F^-$, $Cl^-$, $Br^-$, $I^-$, $SCN^-$, $NO_3^-$, $ClO_4^-$, $BF_4^-$, $SbF_4^-$, $PF_6^-$, $AsF_6^-$, $CH_3CO_2^-$, and the like.

Examples of the reaction solvent (first solvent and second solvent) include an aromatic hydrocarbon such as benzene, toluene, xylene, chlorobenzene, 1,2-dichlorobenzene, and nitrobenzene; an aliphatic hydrocarbon such as n-pentane, n-hexane, and n-heptane; an alicyclic hydrocarbon such as cyclopentane, cyclohexane, and cycloheptane; a nitrile such as acetonitrile and benzonitrile; a sulfoxide such as dimethyl sulfoxide (DMSO); an amide such as N,N-dimethylformamide and N-methylpyrrolidone; an ether such as diethyl ether, tetrahydrofuran, 1,2-dimethoxyethane, and 1,4-dioxane; an alcohol such as methanol, ethanol, and isopropyl alcohol: a ketone such as acetone, methyl ethyl ketone, and cyclohexanone; a cellosolve such as ethylcellosolve; a halogenated hydrocarbon such as dichloromethane, chloroform, carbon tetrachloride, and 1,2-dichloroethane; an ester such as methyl acetate, ethyl acetate, ethyl lactate, and ethyl propionate: water; and the like. These solvents may be used either alone or in combination.

When it is desired to obtain a relatively large single crystal of the polynuclear metal complex, it is preferable that the first solvent and the second solvent be immiscible with each other (i.e., separated into two layers). For example, nitrobenzene, dichlorobenzene, nitrobenzene, a mixed solvent including nitrobenzene and methanol, or a mixed solvent including dichlorobenzene and methanol may be used as the first solvent, and methanol may be used as the second solvent.

The polynuclear metal complexes 1 to 5 can be synthesized in accordance with the methods described in the above literature.

(ii) Crystal Structure Analysis Sample

The crystal structure analysis sample used in connection with one embodiment of the invention has a configuration in which the molecules of the compound (A) are arranged in either or both of the pores and the voids of the single crystal of the porous compound in an ordered manner.

The expression "the molecules of the compound (A) are arranged in an ordered manner" used herein means that the molecules of the compound (A) are included in the pores and the voids of the single crystal of the porous compound in an ordered manner to such an extent that the structure of the compound (A) can be determined by crystal structure analysis.

It is preferable that the crystal structure analysis sample be designed so that the molecular structure can be determined with a resolution of at least 1.5 Å by applying MoKα radiation (wavelength: 0.71 Å) generated at a tube voltage of 24 kV and a tube current of 50 mA to the crystal structure analysis sample, and detecting the diffracted X-rays using a CCD detector.

The crystal structure analysis sample need not necessarily be designed so that the molecule of the compound (A) are included in all of the pores and the voids of the single crystal of the porous compound as long as the structure of the compound (A) can be determined. For example, the solvent used to prepare the solvent solution that includes the compound (A) may be included in some of the pores and the voids of the single crystal of the porous compound.

It is preferable that the occupancy ratio of the molecules of the compound (A) in the crystal structure analysis sample be 10% or more.

The term "occupancy ratio" used herein in connection with the molecules of the compound (A) refers to a value obtained by crystal structure analysis, and represents the amount of guest molecules actually present in the single crystal with respect to the amount (=100%) of guest molecules (i.e., the molecules of the compound (A)) in an ideal inclusion state.

The crystal structure analysis sample can be obtained by bringing the single crystal of the porous compound into contact with the solvent solution that includes the compound (A).

The size of the compound (A) is not particularly limited as long as the compound (A) can enter either or both of the pores and voids of the single crystal. The molecular weight of the compound (A) is normally 20 to 3,000, and preferably 100 to 2,000.

It is also preferable to roughly determine the molecular size of the compound (A) in advance by nuclear magnetic resonance spectroscopy, mass spectrometry, elemental analysis, or the like, and appropriately select a single crystal having appropriate pores and voids.

The solvent used to prepare the solvent solution that includes the compound (A) is not particularly limited as long as the solvent does not dissolve the single crystal, and dissolves the compound (A).

Specific examples of the solvent include an aromatic hydrocarbon such as benzene, toluene, xylene, chlorobenzene, 1,2-dichlorobenzene, and nitrobenzene; an aliphatic hydrocarbon such as n-butane, n-pentane, n-hexane, and n-heptane; an alicyclic hydrocarbon such as cyclopentane, cyclohexane, and cycloheptane; a nitrile such as acetonitrile and benzonitrile; a sulfoxide such as dimethyl sulfoxide (DMSO); an amide such as N,N-dimethylformamide and N-methylpyrrolidone; an ether such as diethyl ether, tetrahydrofuran, 12-dimethoxyethane, and 1,4-dioxane; an alcohol such as methanol, ethanol, and isopropyl alcohol; a ketone such as acetone, methyl ethyl ketone, and cyclohexanone; a cellosolve such as ethylcellosolve; a halogenated hydrocarbon such as dichloromethane, chloroform, carbon tetrachloride, and 1,2-dichloroethane; an ester such as methyl acetate, ethyl acetate, ethyl lactate, and ethyl propionate; water, and the like. These solvents may be used either alone or in combination.

The single crystal of the porous compound may be brought into contact with the solvent solution that includes the compound (A) in an arbitrary way. For example, the single crystal of the porous compound may be brought into contact with the solvent solution that includes the compound (A) using a method that immerses the single crystal of the porous compound in the solvent solution that includes the compound (A), or a method that charges a capillary with the single crystal of the porous compound, and passes the solvent solution that includes the compound (A) through the capillary.

(iii) Collection of Diffraction Data

Examples of the diffraction data that is collected when implementing the method according to one embodiment of the invention include X-ray diffraction data, neutron diffraction data, and the like with respect to the single crystal of the porous compound and the crystal structure analysis sample.

The diffraction data may be collected using a known diffraction data collection method employed when performing single crystal structure analysis.

Figure 1:
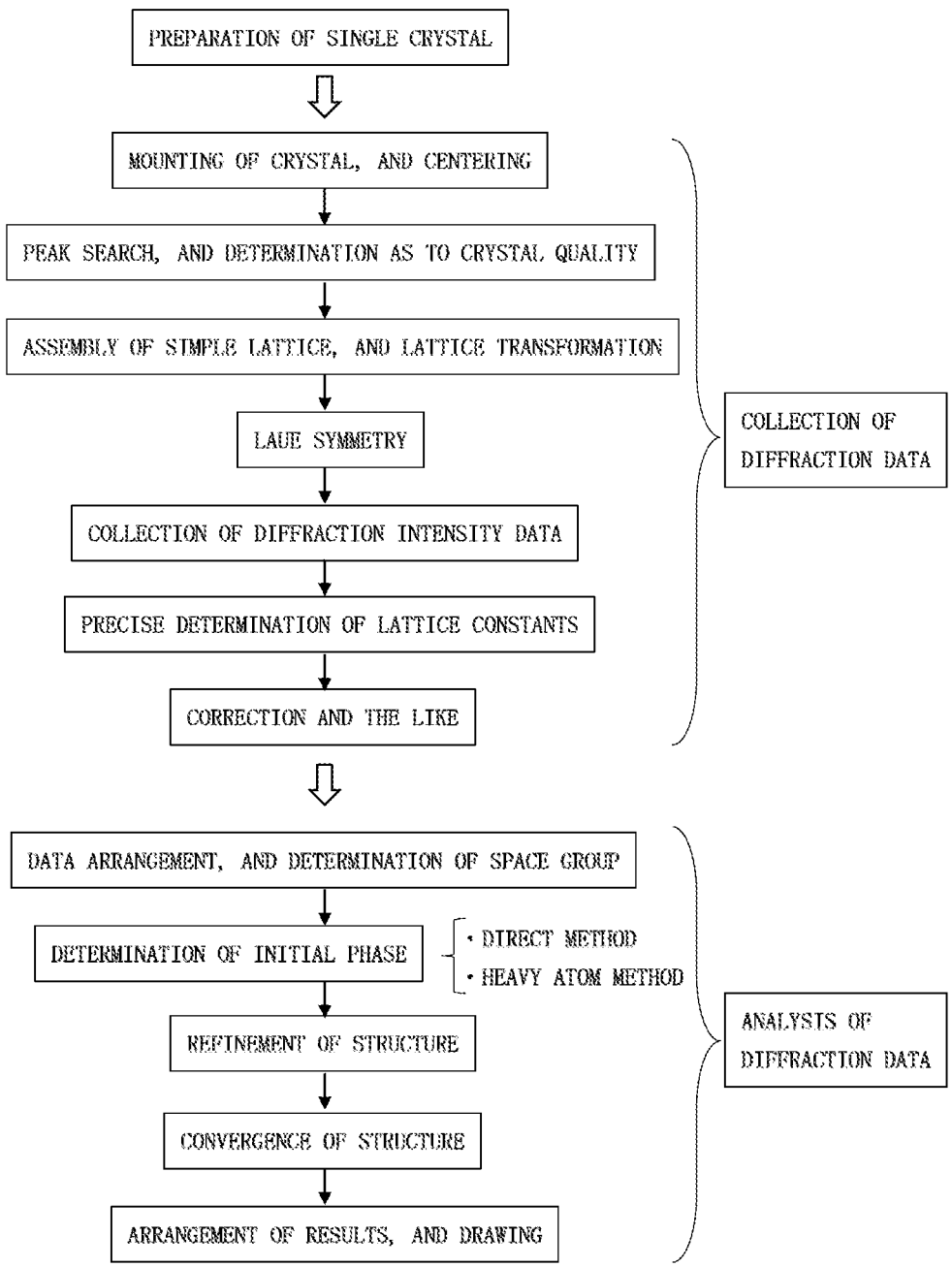
FIG. 1 is a view illustrating a known X-ray crystal structure analysis process.

Specifically, diffraction data may be measured and collected in the same manner as in the known process illustrated in FIG. 1, except that the crystal structure analysis sample is mounted instead of the single crystal. The details of each step illustrated in FIG. 1 are described in Non-Patent Literature 1, for example.

Note that a crystal structure analysis device developed in recent years is designed so that most of the diffraction data collection steps are automatically performed by a computer. The method according to one embodiment of the invention may utilize the diffraction data that has been automatically collected.

Analysis of Diffraction Data

As illustrated in FIG. 2, the diffraction data with respect to the crystal structure analysis sample is analyzed by performing the step (I) that selects a space group that is identical to the space group of the single crystal of the porous compound, or a space group that has a symmetry lower than that of the space group of the single crystal of the porous compound, to be the space group of the crystal structure analysis sample, the step (II) that determines the initial structure of the crystal structure analysis sample using the diffraction data (i.e., the coordinate values of crystallographic data) with respect to the crystal structure of the single crystal of the porous compound as initial values, without determining the initial phase using a known method, and the step (II) that refines the initial structure determined (obtained) by the step (II).

It is necessary to acquire the crystal analysis data (e.g., space group, phase information, and crystal structure information) with respect to the single crystal of the porous compound in advance in order to analyze the diffraction data with respect to the crystal structure analysis sample.

(i) Step (1)

The step (I) selects a space group that is identical to the space group of the single crystal of the porous compound, or a space group that has a symmetry lower than that of the space group of the single crystal of the porous compound, to be the space group of the crystal structure analysis sample.

The step (1) may be performed as described below.

Specifically, the reflection points are indexed. The crystal lattice constants and the Bravais lattice are thus roughly determined.

The term "lattice constant" refers to the length of each crystallographic axis, and the angle between the crystallographic axes. The lattice constants include the angles $\alpha$, $\beta$, and $\gamma$ between the edges of the unit cell, and the lengths a, b, and c of the axes of the unit cell. For example, the lattice constants of a metal complex represented by $[(ZnI_2)_3(TPT)_2]_n$ are a=35, b=15, and c=31 (monoclinic C).

The term "Bravais lattice" refers to a crystal lattice that is classified by a combination of the symmetry (crystal system) of the arrangement of the lattice points, and the lattice type. Fourteen Bravais lattices are known.

The analysis process may be implemented by a computer using a program (e.g., APEX manufactured by Bruker) provided by the manufacturer of an X-ray analyzer, or a general-purpose program (e.g., HKL2000).

When a plurality of candidates have been obtained by the analysis process, a candidate among the plurality of candidates that has lattice constants that are closest to the lattice constants of the parent compound (e.g., a=35, b=15, and c=31 (monoclinic C) when the parent compound is a metal complex represented by $[(ZnI_2)_3(TPT)_2]_n$) is selected to determine the lattice constants and the Bravais lattice.

When lattice constants cannot be determined by the calculation process performed by the computer, the lattice constants of the parent compound (e.g., a=35, b=15, and c=31 (monoclinic C) when the parent compound is a metal complex represented by $[(ZnI_2)_3(TPT)_2]_n$) are input directly, and an error due to the inclusion of the guest compound is refined from the measured data (based on the input data) to determine the lattice constants and the Bravais lattice.

The space group is then determined. The space group may be determined by a computer using the information about the crystal lattice constants and the Bravais lattice determined as described above utilizing a general-purpose program (e.g., PLATON or WPREP (manufactured by Bruker)).

The term "space group" refers to a group that is formed by a set of symmetry elements of a crystal structure.

The term "symmetry element" refers to a symmetry center, a symmetry plane, a glide plane, a rotation axis, and a screw axis, and an operation based on each symmetry element is referred to as "symmetry operation". The term "symmetry" means that an object has an identical shape even when the symmetry operation has been performed on the object.

The spatial symmetry of a crystal is classified into 230 space groups based on a combination of the symmetry element and the Bravais lattice applied to the crystal.

When diffraction data is analyzed based on a wrong space group, the structure analysis may fail, or the molecular structure may be distorted to a large extent. Therefore, it is necessary to determine the true space group from the 230 space groups when analyzing diffraction data.

According to a known space group determination method, it is necessary to perform calculations based on the direction and the intensity of the diffracted X-rays, and special crystallographic knowledge with regard to the extinction rules and the like is required.

The method according to one embodiment of the invention is designed based on the fact that the three-dimensional framework of the crystal structure analysis sample (hereinafter may be referred to as "single crystal ($\alpha$)") is considered to be identical to the three-dimensional framework of the single crystal (hereinafter may be referred to as "single crystal ($\beta$)") of the porous compound used to prepare the crystal structure analysis sample, and utilizes the space group of the single crystal ($\beta$) when determining the space group of the single crystal ($\alpha$).

More specifically, the method according to one embodiment of the invention selects a space group that is identical to the space group of the single crystal ($\beta$), or a space group that has a symmetry lower than that of the space group of the single crystal of the porous compound (i.e., a space group obtained by excluding an arbitrary symmetry element from the space group of the single crystal ($\beta$)), to be the space group of the single crystal ($\alpha$), and analyzes the diffraction data.

For example, the space group of the polynuclear metal complex 1 ($[(ZnI_2)_3(TPT)_2(PhNO_2)_{5.5}]_n$) is C2/c. Therefore, when a crystal structure analysis sample has been prepared using the polynuclear metal complex 1, the space group "C2/c" is basically input as the candidate space group, and the analysis process is performed. When the guest compound is present in the symmetry plane (i.e., data in pseudosymmetry has been obtained), the subgroup (Cc, C2, P21, P-1, P1) of the parent space group C2/c is input, and a calculation process is performed to easily arrive at the true space group.

Since the number of candidate space groups is limited as described above, it is possible to efficiently determine the true space group.

Whether or not the true space group has been obtained may be determined based on whether or not the resulting structure has a problem.

The space group may be described using Hermann-Mauguin symbols or Schoenflies symbols.

(ii) Step (II)

The step (II) analyzes the diffraction data with respect to the single crystal ($\alpha$) using the diffraction data (i.e., the coordinate values of crystallographic data) with respect to the crystal structure of the single crystal ($\beta$) as initial values to determine the initial structure of the single crystal ($\alpha$).

When implementing the method according to one embodiment of the invention, since the single crystal ($\alpha$) and the single crystal ($\beta$) have a common three-dimensional framework, the crystal structure of the single crystal ($\beta$) can be used as a model.

A process that obtains a crystal structure is obtained by X-ray single crystal structure analysis is synonymous with a process that calculates a function (structure factor F) that describes the electron density around the atoms included in the crystal. However, only the magnitude of the complex function F can be determined from the data with respect to the diffraction points that can be measured. It is necessary to calculate the part that corresponds to the phase in order to describe the complete complex function F. In this case, it is necessary to provide an appropriate approximate value to the observation data, and determine the degree of coincidence between the diffraction points estimated by a calculation process and the measured data.

According to a known method, it is impossible to implement structure analysis when an appropriate approximate value (initial phase) cannot be obtained (i.e., initial phase problem).

The method according to one embodiment of the invention uses the crystal structure analysis sample obtained by introducing the analysis target compound into the single crystal ($\beta$) (crystal sponge) of which the space group and the structure are known. Therefore, an approximate value is known with respect to the space group and the initial phase. This is because the single crystal ($\alpha$) and the single crystal ($\beta$) have an almost identical framework structure. The method according to one embodiment of the invention can determine the initial structure while preventing the occurrence of the initial phase problem by performing analysis using the approximate value.

The initial structure may be determined by analyzing the diffraction data with respect to the single crystal ($\alpha$) using a direct method, a heavy atom method, a molecular replacement method, or the like. These methods may be implemented using a program.

The program is not particularly limited as long as the initial structure can be determined by analyzing the diffraction data with respect to the single crystal ($\alpha$) using a direct method, a heavy atom method, a molecular replacement method, or the like. For example, a known program such as SHELX, SIR, Superflip, X-PLOR (manufactured by Molecular Simulations), and AMORE (see CCP4 (Collaborative Computational Project. Number 4, Acta Crystallogr. D50, pp. 670-673 (1994))), may be used.

(iii) Step (I)

The step (III) refines the crystal structure determined (obtained) by the step (II).

The step (III) is the same as a known structure refinement step. The step (III) repeats a process that uses a least-square method, Fourier synthesis (difference Fourier synthesis), or the like to obtain a crystal structure that conforms to the measured diffraction data, and determine the molecular structure (Non-Patent Literature 1).

These methods may be implemented using a program. The program is not particularly limited as long as a crystal structure that conforms to the measured diffraction data can be obtained, and the molecular structure can be determined by repeating a process that uses a least-square method, Fourier synthesis (difference Fourier synthesis), or the like. For example, a known program such as SHELXL, REFMAC, and Xtal may be used.

It is normally necessary to determine an appropriate space group and an appropriate initial phase in order to analyze diffraction data, and special crystallographic knowledge is normally required to appropriately implement these steps.

Since the method according to one embodiment of the invention utilizes a single crystal of a porous compound of which the crystal structure is known, researchers and the like who are unfamiliar with crystallography can conveniently and efficiently analyze diffraction data by utilizing the method according to one embodiment of the invention.

The steps (I) to (III) may be implemented by causing a computer to successively perform the program that implements each step.

2) Computer Program

A computer program according to one embodiment of the invention causes a computer to implement the method for analyzing diffraction data according to one embodiment of the invention.

The computer program according to one embodiment of the invention is installed on a computer, and successively implements a process that collects the diffraction data, a process that displays a candidate space group (process (I)), a process that arranges the data, and determines the space group that is used to analyze the diffraction data (process (II)), a process that determines the initial structure of the single crystal (α) using the diffraction data (e.g., crystallographic data) with respect to the crystal structure of the single crystal (β) as initial values (process (III)), and a process that refines the initial structure (process (IV)).

A program that implements each process is executed when implementing each process.

The computer program according to one embodiment of the invention is a set of these programs, and successively implements the processes (I) to (IV).

The computer program according to one embodiment of the invention is installed on a processing device that includes a main control unit (CPU), an input-output device, and a storage device, and is executed by the processing device.

The main control unit (CPU) is a device that executes a program, and performs a calculation process.

The input-output device includes a reader that reads data from a recording medium that stores a program, an Internet communication means, and a user interface (e.g., display screen and keyboard).

The storage device is a device that stores program data that has been loaded, and data that is currently used.

Examples of the program data include program data that is used to implement each of the processes (I) to (IV), crystal structure diffraction data (space group and crystal structure) with respect to the parent compound (i.e., the single crystal of the porous compound before the guest compound is included therein), diffraction data with respect to the compound that is subjected to crystal structure analysis, data that represents a general space group, and the like.

The computer program according to one embodiment of the invention may be acquired from a recording medium (CD-ROM) or the Internet, for example.

Process (I)

The process (I) implements the step (I) included in the method according to one embodiment of the invention, and derives a candidate space group. Specifically, the process (I) selects a space group that is identical to the space group of the single crystal of the porous compound, or a space group that has a symmetry lower than that of the space group of the single crystal of the porous compound, to be the space group of the crystal structure analysis sample, and displays the candidate space group on the display screen.

More specifically, the user inputs the space group of the parent compound (i.e., the single crystal of the porous compound before the guest compound is included therein) to the computer, and the computer displays the candidate space group.

For example, the space group of a single crystal of $[(ZnI_2)_3(TPT)_2(PhNO_2)_{5.5}]_n$ is C2/c. When the user has input a space group "C2/c", a subgroup (Cc, C2, P21, P-1, P1) is displayed together with the parent space group "C2/c".

The analysis process may be implemented by a computer using a program (e.g., APEX manufactured by Bruker) provided by the manufacturer of an X-ray analyzer, or a general-purpose program (e.g., HKL2000).

The computer is provided with a memory area that stores data with respect to each space group. The computer may have a function of displaying a subgroup of the parent space group together with the parent space group when the user has input the parent space group.

The computer program according to one embodiment of the invention may cause the computer to implement a process that presents the processing results to the user after implementing the process (I), or may cause the computer to implement the process (II) without implementing a process that presents the processing results to the user.

Process (II)

The process (II) implements the step (I) included in the method according to one embodiment of the invention, and performs a calculation process that determines the space group. Specifically, the process (II) determines one space group selected from the group consisting of a space group that is identical to the space group of the single crystal of the porous compound, and the space group derived by the process (I), to be a space group that is used to analyze the diffraction data.

The space group may be determined by the computer using the information about the crystal lattice constants and the Bravais lattice determined as described above utilizing a general-purpose program (e.g., PLATON or WPREP (manufactured by Bruker)).

The process (II) determines one space group selected from the group consisting of a space group that is identical to the space group of the single crystal of the porous compound, and the space group derived by the process (I), to be a space group that is used to analyze the diffraction data.

The space group may be determined based on the determination made by the user, or may be determined by the computer according to rules set in advance.

When the space group is determined based on the determination made by the user, the program may be provided with a function of causing the computer to present the processing results to the user after implementing the process (I), and the user may select (determine) one space group from the processing results presented to the user.

When the space group is determined by the computer, rules may be provided in advance so that the computer selects a space group having high symmetry, for example. For example, the computer may be programmed to perform calculations using the subgroup (Cc, C2, P21, P-1, P1) of the parent space group C2/c when it is likely that the guest compound is present in the symmetry plane (i.e., when data in pseudosymmetry has been obtained).

Process (III)

The process (III) implements the step (II) included in the method according to one embodiment of the invention. Specifically, the process (III) determines the initial structure of the crystal structure analysis sample using the space group determined by the process (II), and the diffraction data with respect to the crystal structure of the single crystal of the porous compound as initial values. The process (II) thus determines the initial structure that is to be refined.

According to one embodiment of the invention, since the framework structure of the host molecule (i.e., the single crystal of the porous compound) that is considered to be observed when the initial phase has been determined, is known in advance, it is possible to directly determine the initial structure of the crystal structure analysis sample using the information about the lattice constants and the space group (determined in advance) without executing a program that determines the initial phase.

The process (III) may be implemented using a program based on the space group determined by the process (II), and the crystal structure of the single crystal of the porous compound. The program is not particularly limited as long as the process (III) can be implemented. For example, a known program such as SHELX, SIR, Superflip, X-PLOR (manufactured by Molecular Simulations), and AMORE (see CCP4 (Collaborative Computational Project, Number 4, Acta Crystallogr. D50, pp. 670-673 (1994))), may be used.

Process (IV)

The process (IV) implements the step (III) included in the method according to one embodiment of the invention. Specifically, the process (IV) refines the initial structure determined (obtained) by the process (III).

The process that refines the initial structure utilizes the reflection data (hkl file), and the data file (ins file) of the initial structure that has not been refined.

Specifically, the process (IV) is implemented as described below.

The coordinate values of the atomic group that forms the framework of the host compound (i.e., the single crystal of the porous compound) are applied to the coordinate values of the initial structure that has not been refined. In this case, the coordinate values of the atomic group that forms the framework of the host compound (i.e., the single crystal of the porous compound) may be copied to the data file (ins file) of the initial structure.

The structure may be refined using the coordinates as initial values. The structure may be refined using a Fourier method, a least-square method, a maximum likelihood method, or the like.

This process is implemented in the same manner as in a known refinement process, and may be implemented using a program. The program is not particularly limited as long as the refinement process can be implemented. For example, a known program such as SHELXL, REFMAC, and Xtal may be used.

The computer program according to one embodiment of the invention may have a function of displaying the projection drawing of the entire molecule, the interatomic distance, the bond angle, and the like with respect to the molecular structure obtained by the refinement process.

The computer program according to one embodiment of the invention can efficiently implement the method according to one embodiment of the invention. Therefore, researchers and the like who are unfamiliar with crystallography can conveniently and efficiently analyze diffraction data by utilizing the program according to one embodiment of the invention.

3) Recording Medium

A recording medium according to one embodiment of the invention is a computer-readable recording medium that stores the computer program according to one embodiment of the invention.

Examples of the recording medium include a flexible disk (FD), an MO disk, a CD-R, a CD-RW, a DVD-ROM, a DVD-RAM, an external HDD, a memory card, a USB memory, a silicon disk, an HDD-compatible silicon disk, and the like. The computer program according to one embodiment of the invention may be divided, and recorded on a plurality of recording media.

EXAMPLES

The invention is further described below by way of examples. Note that the invention is not limited to the following examples.

The three-dimensional structure of humulene (2,6,6,9-tetramethyl-1,4-8-cycloundecatriene) was determined by performing a phase determination process using a heavy atom method in a state in which humulene is present within a crystal together with silver ions (see J. Chem. Soc. B, pp. 112-120 (1966)).

A single crystal of a porous compound A (e.g., $[(ZnI_2)_3(TPT)_2(PhNO_2)_{5.5}]_n$) of which the molecular structure is known, and in which humulene was included in the pores thereof was prepared, and used as a crystal structure analysis sample. When structure analysis was performed using a known program (e.g., SHELXL) utilizing a reflection data file collected from the crystal structure analysis sample, and a data file that describes only the atomic coordinates of the porous compound A, the structure of the host compound promptly changed to the atomic positions optimized for inclusion of humulene without determining the phase, and some of the atoms included in humulene were observed as an initial structure.

The molecular structure of humulene can be easily determined by performing a structure refinement process using a known program utilizing the resulting data that represents the initial structure.

When the porous compound A of which the molecular structure is known is $[(ZnI_2)_3(TPT)_2(PhNO_2)_{5.5}]_n$, the data file that describes only the atomic coordinates of the porous compound A can be obtained by deleting the data that corresponds to $(PhNO_2)$ (i.e., solvent) from the crystallographic data with respect to the porous compound A.

Figure 5:
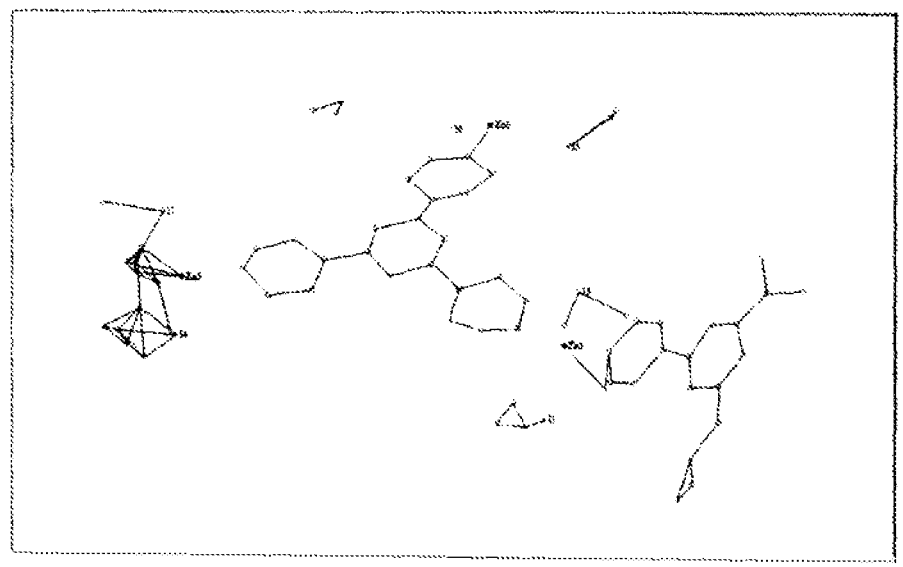
FIG. 5 is a view illustrating the structure of a complex that is obtained when shelxs (i.e., a program that acquires the initial structure) is executed.
Figure 6:
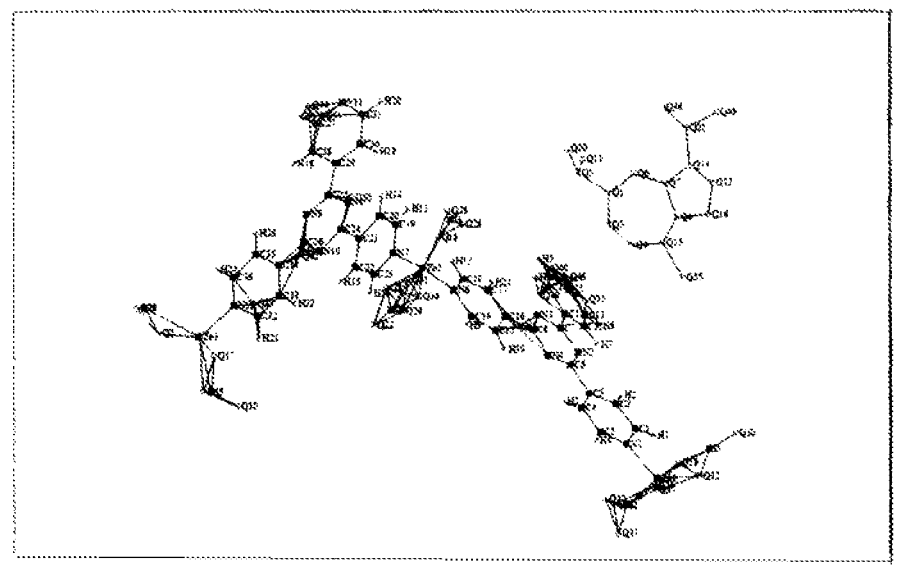
FIG. 6 is a view (state diagram obtained when structure analysis is started) illustrating a state in which the structure of guaiazulene is almost completely observed as a result of determining the initial structure using a method according to one embodiment of the invention.

When shelxs (i.e., a program that acquires the initial structure) was executed with respect to the data obtained using a crystal in which a guaiazulene molecule was included in a porous complex, only the structure of the complex was obtained (see FIG. 5). When the initial structure was determined using the method according to one embodiment of the invention, structure analysis could be performed in a state in which the structure of guaiazulene was almost completely observed (see FIG. 6).

REFERENCE SIGNS LIST

1: Crystal plane X
2: Crystal plane Y
3: Pore
4: Extension direction of pore

The invention claimed is:

1. A method for analyzing diffraction data obtained using a crystal structure analysis sample,
the crystal structure analysis sample comprising a single crystal of a porous compound, and a compound for which a structure is to be determined,
the single crystal of the porous compound having a three-dimensional framework, and either or both of pores and voids that are defined by the three-dimensional framework, and are three-dimensionally arranged in an ordered manner, the three-dimensional framework having been determined by crystal structure analysis, and molecules of the compound for which the structure is to be determined being arranged in either or both of the pores and the voids in an ordered manner to such an extent that they can be observed by crystal structure analysis, the method comprising:
a step of providing the crystal structure analysis sample including the single crystal of the porous compound whose space group is already known;
a step of providing a diffraction data of a crystal structure of the porous compound previously analyzed;
a step (I) to assume a space group of the crystal structure analysis sample as being identical to the space group of the single crystal of the porous compound, or having a symmetry lower than that of the space group of the single crystal of the porous compound;

a step (II) that determines an initial structure of the crystal structure analysis sample using the diffraction data of the crystal structure of the porous compound; and a step (III) that refines the initial structure determined by the step (II), thereby obtaining a crystal structure of the crystal structure analysis sample for which the structure is to be determined, wherein the single crystal of the porous compound is a single crystal of a polynuclear metal complex, and the compound for which the structure is to be determined is a compound having a molecular weight of 20 to 3,000.

2. The method for analyzing diffraction data obtained using a crystal structure analysis sample according to claim 1, wherein the step (III) repeats a process that uses a least-square method, or Fourier synthesis (difference Fourier synthesis) to obtain a crystal structure that conforms to the measured diffraction data, and determine the molecular structure.

3. The method for analyzing diffraction data obtained using a crystal structure analysis sample according to claim 1, wherein the crystal structure analysis sample is provided before performing the step (I).

4. The method for analyzing diffraction data obtained using a crystal structure analysis sample according to claim 1, wherein the single crystal of the porous compound includes a plurality of ligands having two or more coordinating moieties, and a plurality of metal ions that serve as the central metal.

* * * * *